UNITED STATES PATENT OFFICE 2,658,849

FIBER BONDING RESIN AND BONDED PRODUCT

Baak W. Lew, Arden, Del., assignor to Atlas Powder Company, Wilmington, Del., a corporation of Delaware No Drawing. Application January 30, 1951, Serial No. 208,657

12 Claims. (Cl. 154—128)

This invention relates to bonded mats of fibrous material, to resin castings and moldings reinforced with such mats, and more particularly to novel resin compositions adapted to the bonding of such mats.

It is an object of the invention to provide resin bonded mats of fibrous materials, particularly of glass fibers, suitable for use as plastics reinforcements.

Another object is to provide novel resin compositions of wide utility, which are particularly suited for use as bonding resins in the preparation of glass fiber mats.

A still further object is to provide novel powdered, autopolymerizable resin compositions containing polymerizing catalysts.

The above and other objects will become more apparent in the course of the following description and the appended claims.

In accordance with the present invention a novel heterogeneous resin composition is provided which comprises a intimate physical mixture of solid resin particles in powder-to-granular form, said mixture containing discrete particles of one polyester resin which is a fumarate of ethylene glycol; and discrete particles of a second polyester resin which is a fumaric acid ester of a polyol comprising from 90 to 100 mol per cent of a dihydric alcohol corresponding to the formula:

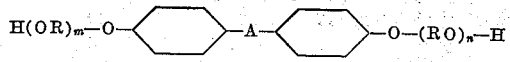

wherein R is an alkylene radical containing from 2 to 3 carbon atoms, A is a 2-alkylidene radical containing from 3 to 4 carbon atoms, $m$ and $n$ are each at least one, and the average sum of $m+n$ is not over 3, and from 0 to 10 mol per cent of an aliphatic polyhydric alcohol containing from 3 to 6 carbon atoms and at least 3 hydroxyl groups. The second named component of the resin composition is characterized by the presence of a bisphenol nucleus,

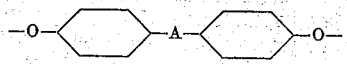

and for convenience will be designated hereinafter as bisphenol type polyesters. Both of the named component resins are polymerizable under the effect of heat and in the presence of the ordinary vinyl polymerization catalysts, and the resin compositions of the invention may contain small but significant amounts of such catalyst thoroughly incorporated with the resin particles. Among suitable catalysts may be named benzoyl peroxide, lauroyl peroxide, stannic chloride pentahydrate, cobalt nitrate, and the like. The compositions may contain up to 5 per cent by weight (based on active ingredient) of said catalyst depending upon the rate of cure desired and the activity of the catalyst.

Ethylene glycol fumarate resins are well known in the plastics and resin art. They are normally prepared by heating together, in an inert atmosphere, fumaric acid with a stoichiometric excess of ethylene glycol, first under partial reflux conditions to allow water of condensation to distil out while glycol is refluxed into the charge, and finally at higher temperature and reduced pressure whereby the excess glycol is removed and a linear resinous polymer is formed. The polymer so formed is balsam-like at room temperature and cannot be powdered as long as it remains in amorphous condition. When crystallization of the mass occurs, or is induced, the polyester becomes hard and brittle, and can readily be reduced to a powder. The ethylene glycol fumarate component of the mixtures of the present invention is in the crystalline form and reduced to such size that it will all pass a No. 10 U. S. Standard Sieve and preferably will all pass a No. 20 U. S. Standard Sieve, while at least 75% will be held on a No. 140 U. S. Standard Sieve.

Polyester resins suitable as the second named ingredient of the heterogeneous resin compositions of the present invention are readily prepared according to methods taught in copending application Serial No. 92,746, filed May 11, 1949, and Application Serial No. 190,240, filed October 14, 1950, both assigned to the assignee of the present invention. They are fumaric acid polyesters of diols or diol-polyol mixtures as described above. Exemplifying diols suitable for preparing the said polyesters are 2.2-di-(4 beta hydroxyethoxyphenyl) - propane, 2.2 - di - (4 hydroxy propoxyphenyl) - propane, 2.2 - di - (4 beta hydroxy ethoxy phenyl) - butane, and the polyoxyethylene ether of isopropylidene diphenol wherein both phenolic hydroxyls are oxyethylated and the average number of oxyethylene groups per mol is 2.6. Polyols which may be used to replace an equivalent quantity up to 10 mol per cent of diols in preparing said polyesters include glycerol, pentaerythritol, sorbitol, mannitol, sorbitan, erythritol, and the like. In its preferred embodiment, the resin composition of the present invention contains as the second named component a fumaric acid ester of a mixed diol-polyol comprising 96 mol per cent of 2.2-di-(4 beta hydroxyethoxyphenyl)-propane and 4 mol per cent of glycerol. Such a resin may be prepared in accordance with the following example.

EXAMPLE I

A reaction kettle fitted with an agitator means for maintenance of an inert atmosphere, means for applying vacuum and means for condensing and measuring evolved water was charged with 275 lbs. of 2.2-di(4-beta hydroxy ethoxy phenyl)-propane, 104 lbs. 6 oz. of fumaric acid and 32 grams of hydroquinone. The charge was heated and agitated in an atmosphere of carbon dioxide at a temperature of 180° to 185° C. until 50% of the theoretical water was evolved, after which the temperature was raised to 205° to 210° C. and the reaction continued until 75% of the theoretical water had been collected. 3 lbs. 6 oz. of glycerol was then added and heating continued at the same temperature until the acid number of a withdrawn sample was down to 30. A vacuum of 9 mm. was then applied and the reaction continued at 205° to 215° C. until the resin had a melting point by the ASTM ball and ring method of 120° C.

Resins of the type so described and exemplified are hard, brittle, apparently amorphous solids at room temperature, and show no visible tendency to crystallize on aging. As employed in the present invention, they are reduced by any suitable grinding means to a particle size such that all will pass a No. 10 U. S. Standard sieve, and preferably to a particle size such that all will pass a No. 20 U. S. Standard sieve, while at least 75% will be held by a 140 mesh screen.

The heterogeneous resin compositions particularly adapted for use as bonding resins in forming fibrous reinforcing mats of glass fibers and the like are prepared by intimately mixing crystalline ethylene glycol fumarate resin, ground as indicated hereinbefore, and one or more of the above described powdered-to-granular bisphenol type polyester resins. The preferred resin compositions contain substantially equal proportions of the two named types of resin although useful compositions include those wherein the proportion of glycol fumarate to bisphenol type resin lies between the inclusive limits of 75 to 25 and 25 to 75. The mixing may be effected by any suitable means such as in a tumbling barrel, a ribbon mixer, a Werner-Pfleiderer mixer, or the like.

A marked convenience of the resin compositions of the present invention resides in the fact that in the solid state the resins are virtually inert towards the common vinyl polymerization catalysts. When the resins are mixed, catalysts may be incorporated in proper amounts for the intended use of the mixture, and the precatalyzed mixture stored, without special precautions such as refrigeration, until used. Such precatalyzed compositions are within the scope of the present invention, and may contain any amount up to 5 per cent by weight of catalyst although it is usually preferred to employ from 1 to 2.5 per cent by weight thereof.

The following examples illustrate the preparation of typical bonding resin compositions according to the invention.

EXAMPLE II

Separately grind crystalline ethylene glycol fumarate and the resin of Example I until all passes a No. 20 U. S. Standard sieve. Charge a 55 gallon drum with 100 lbs. of each resin, adding the resin in alternate increments of about 50 lbs. each. Close the drum and rotate it end over end at about 50 r. p. m. for 8 hours. The product is uniform throughout and consists of an intimate mixture of discrete particles of the two resins.

EXAMPLE III

Employing the same ground resins as in Example II and powdered benzoyl peroxide as a catalyst, charge the drum as follows: Add 49 lbs. glycol fumarate, 1 lb. catalyst, 49 lbs. Example I resin, 1 lb. catalyst, 49 lbs. glycol fumarate, 1 lb. catalyst, 49 lbs. Example I resin, 1 lb. catalyst. Tumble for 8 hours as in Example II. The product is uniform throughout and comprises intimately mixed discrete particles of the two named resins, with 2% of polymerizing catalyst thoroughly distributed therein.

EXAMPLE IV

Charge the tumbling barrel of Example II with the increments tabulated below and tumble for 8 hours:

Increments 1 and 5, 24 lbs. ethylene glycol fumarate (ground)
Increments 2, 4, 6 and 8, 1 lb. stannic chloride pentahydrate (powdered)
Increments 3 and 7, 74 lbs. Example I resin (ground)

EXAMPLE V

Charge the tumbling barrel of Example II with the increments tabulated below and tumble for 8 hours:

Increments 1 and 5, 74 lbs. ethylene glycol fumarate (ground)
Increments 2, 4, 6 and 8, 1 lb. lauroyl peroxide (powdered)
Increments 3 and 7, 24 lbs. Example I resin (ground)

EXAMPLE VI

Separately grind crystalline ethylene glycol fumarate polyester and the fumarate polyester resin of 2.2-di(4 hydroxy propoxy phenyl) propane until all passes a No. 20 U. S. Standard sieve. Tumble equal proportions thereof with 2% of benzoyl peroxide as catalyst according to the technique of Example III.

Resin compositions of the type described and exemplified above may be employed for a wide variety of purposes. For example the mixture may be incorporated with granular cork, compressed into slabs and cured to form gasket material. The resin mixtures may be compression molded with or without fillers to yield a variety of useful shapes. The compositions may be dusted into freshly printed matter and fused to yield excellent decorative effects simulating embossed work. The resin compositions have been found particularly well suited for use in bonding fibrous materials into mats and their utility for this purpose will be exemplified herein in some detail. Precatalyzed resin compositions may be incorporated with natural organic fibers such as cotton, cellulose pulp, wool; or with synthetic organic fibers such as rayon, nylon or spun filaments of vinyl polymers; or with inorganic fibers such as glass fiber, rock wool fibers, asbestos and the like, formed into mats and cured.

Glass fiber mats so prepared are especially useful as reinforcing elements for cast resin forms, laminates and moldings. The bonded mats may be formed flat, cut to shape, and laid in a mold in single or multilayer, impregnated with resin and cured; or, alternatively, fibrous mats may be formed directly in the shape of the desired article by blowing the mixed fibers and powdered-to-granular resin composition against a shaped perforated screen, subjecting to curing conditions, and removing the bonded shaped mat from the screen. The preformed mat may then be placed in a mold cavity, impregnated with resin, compressed and cured. These techniques are more specifically taught in the following example.

EXAMPLE VII

A bonded mat of glass fibers in sheet form weighing approximately 2 ounces per square foot was prepared as follows:

One half ounce of glass fibers in the form of strands averaging 2½ inches long, each strand being composed of approximately 204 filaments averaging 0.00038 inch in diameter, was weighed out and divided into 4 roughly equal portions. One portion was spread as a layer of unoriented fibers on a flat square metal plate 6" on a side. 0.35 gram of the precatalyzed resin mixture of Example III was sprinkled uniformly over the surface of the fibers. Two more portions of the fibers were then spread over the first layer and 0.70 gram of the same precatalyzed resin sprinkled thereon. Finally the fourth portion of fibers was layered on the others and another 0.35 gram portion of the precatalyzed resin mixture sprinkled over the top. The plate containing the built up layers was tapped gently to cause sifting of the resin into the fiber interstices, covered with a second metal plate and weighted with two iron bars to put the mat under a uniform pressure of 0.2 lbs. per square inch. The assembly was put in a curing oven at 200° C. for 5 minutes and removed. The mat, removed from between the plates was well bonded by the cured resin and was suitable for use as a reinforcing element in plastics molding.

Mats have been prepared in similar fashion in which the powdered-to-granular bonding resin is a mixture of ethylene glycol fumarate with approximately its own weight of the fumarate of 2.2 di-(4-hydroxy propoxy phenyl) propane. The technique described may be readily adapted to commercial production of bonded glass fiber mats by sifting proportioned quantities of chopped fiber glass strands and the resin mixture of the present invention onto a moving conveyor belt, passing the mat through a curing oven and under a compression roller therein.

Glass fiber mats bonded with the heterogeneous resin compositions described herein have properties sharply differentiating them from mats bonded with either of the component resins alone, or from a homogeneous mixture of the two.

Resins of the bisphenol type produce mats of good compressibility and satisfactory properties for many purposes. Mats so prepared, however, are sensitive to the styrene present in most laminating resins, even when thoroughly cured, and in some laminations and moldings the matted fibers are not held in position by the bonding resin when laminating resin solution is introduced, resulting in uneven fiber distribution in the finished reinforced plastic.

With granular ethylene glycol fumarate alone as the bonding resin it is very difficult to obtain glass fiber mats satisfactory for any purpose requiring manipulations thereof. The cured resin is brittle and shows very little heat distortion. Probably because of these properties the bonded mats exhibit poor compressibility and flexibility, resulting in fluffy mats of poor dry strength.

The cured resin is virtually inert to styrene and cannot contribute to adhesion between the reinforcing fibers and the laminating resins.

It has been attempted to combine the desirable properties of the two types of resins in a single resin by coreacting mixtures of a bisphenol ether-alcohol and ethylene glycol with fumaric acid, and by melting the two types of resin together below any temperature at which transesterification would occur, but without success. Useful resins for many purposes, especially as base resins in molding powders, have been prepared by coreacting ethylene glycol and alcohols of the type represented by the formula

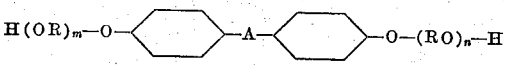

as is more fully described in copending application Serial No. 190,239 filed October 14, 1950 and assigned to the same assignee as the present application, but such resins are not the equivalent of the heterogeneous compositions containing discrete particles of the two types of resins for purposes of bonding glass fiber mats suitable as reinforcing means for plastics.

Without entering into any speculation as to why it should be true, it seems that there is a unique and unexpected advantage in simultaneously curing into glass fiber mats separate and discrete particles of the two types of resin hereinbefore described, and it is on the discovery of this advantage that the following claims are based.

What is claimed is:

1. A heterogeneous resin composition consisting essentially of from 25 to 75 parts by weight of discrete particles of crystalline ethylene glycol fumarate polyester resin; and from 75 to 25 parts by weight of discrete particles of a fumaric acid resinous polyester of a polyol consisting of from 90 to 100 mol per cent of a diol conforming to the formula

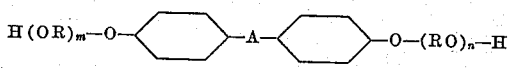

wherein R is an alkylene radical containing from 2 to 3 carbon atoms, A is a 2-alkylidene radical containing from 3 to 4 carbon atoms, $m$ and $n$ are each at least one, and the average sum of $m$ and $n$ is not over 3, and from 0 to 10 mol per cent of an aliphatic polyhydric alcohol containing from 3 to 6 carbon atoms and at least 3 hydroxyl groups; to a total of 100 parts.

2. A heterogeneous precatalyzed resin composition for bonding loosely felted mats of glass fibers, which consists essentially of at least 95 per cent by weight of a mixture of resins as described in claim 1 and a small but significant amount, not to exceed 5 per cent by weight, of a vinyl polymerization catalyst.

3. A heterogeneous resin composition consisting essentially of approximately equal parts by weight of discrete particles of crystalline ethylene glycol fumarate polyester resin and discrete particles of a fumaric acid resinous polyester of a polyol consisting of from 90 to 100 mol per cent of a diol conforming to the formula

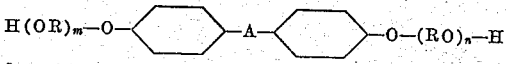

wherein R is an alkylene radical containing from 2 to 3 carbon atoms, A is a 2-alkylidene radical containing from 3 to 4 carbon atoms, $m$ and $n$ are each at least one, and the average sum of $m$ and $n$ is not over 3, and from 0 to 10 mol per cent of an aliphatic polyhydric alcohol containing from 3 to 6 carbon atoms and at least 3 hydroxyl groups.

4. A composition for bonding loosely felted mats of glass fibers comprising the heterogeneous resin composition of claim 1, wherein the said discrete particles are of a size such that substantially all passes through a No. 10 U. S. Standard sieve, and at least 75% by weight is held by a No. 140 U. S. Standard sieve.

5. A composition for bonding loosely felted mats of glass fibers consisting essentially of equal parts by weight of discrete particles of crystalline ethylene glycol fumarate polyester resin and discrete particles of a resinous polyester of fumaric acid and a mixed polyol consisting of from 94 to 98 mol per cent of 2.2-di-(4 beta hydroxyethoxy phenyl) propane and from 2 to 6 mol per cent of glycerol.

6. A composition for bonding loosely felted mats of glass fibers, consisting essentially of at least 95% by weight of a mixture of resins as in claim 5 and a small but significant amount, not to exceed 5%, of a vinyl polymerization catalyst.

7. A bonded mat of loosely felted glass fibers comprising glass fibers arranged in helter-skelter pattern, bound at a plurality of the points of contact between said fibers with a heterogeneous resin composition as described in claim 2.

8. A bonded mat as described in claim 7 wherein the weight ratio of said glass fibers to said heterogeneous resin composition lies between the inclusive limits of 97 to 3 and 85 to 15.

9. A bonded mat of loosely felted glass fibers comprising glass fibers arranged in helter-skelter pattern, bound at a plurality of the points of contact between said fibers with the cured product of the composition of claim 6, wherein the weight ratio of said glass fibers to said cured product lies between the inclusive limits of 97 to 3 and 85 to 15.

10. The process of preparing a bonded glass fiber mat which comprises arranging a loose blanket consisting of glass fibers and discrete particles of a heterogeneous resin composition as described in claim 2, and subjecting the blanket to the curing temperature of the precatalyzed resin for a sufficient time to effect its cure.

11. The process of claim 10 wherein the weight ratio of said glass fibers to said resin composition lies between the inclusive limits of 97 to 3 and 85 to 15.

12. The process of preparing a bonded glass fiber mat which comprises arranging a loose blanket consisting of from 97% to 85% of glass fibers and from 3% to 15% of discrete particles of a heterogeneous resin composition as described in claim 6, and subjecting the blanket to the curing temperature of the precatalyzed resin for a sufficient time to effect its cure.

BAAK W. LEW.

References Cited in the file of this patent

UNITED STATES PATENTS

| Number | Name | Date |
|--------|------|------|
| 758,246 | Goldman | Apr. 26, 1904 |
| 2,437,046 | Rothrock et al. | Mar. 2, 1948 |
| 2,568,144 | Cremer | Sept. 18, 1951 |
| 2,604,427 | Armstrong | July 22, 1952 |